INVENTORS
LLOYD S. DURWARD, JR.,
WALTER GIGER, JR.,
WERNER A. KRAUSE

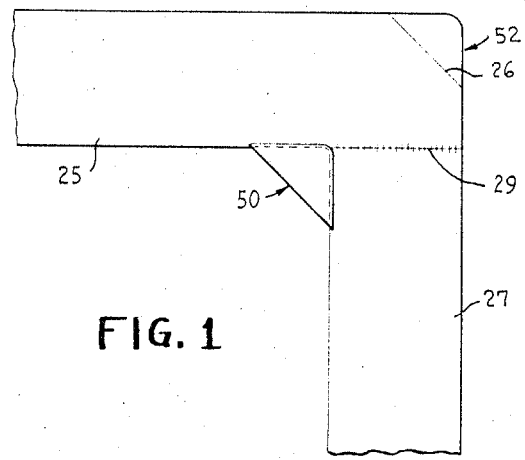
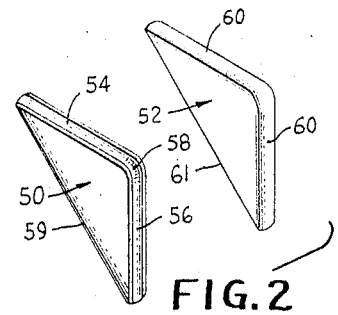
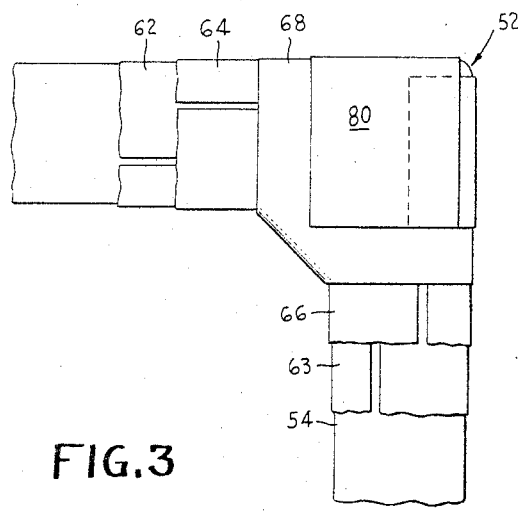
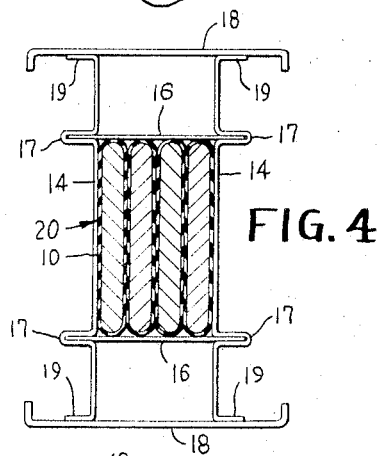
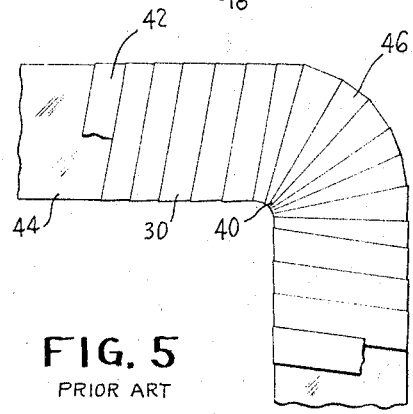

BY Robert F. Casey
ATTORNEY

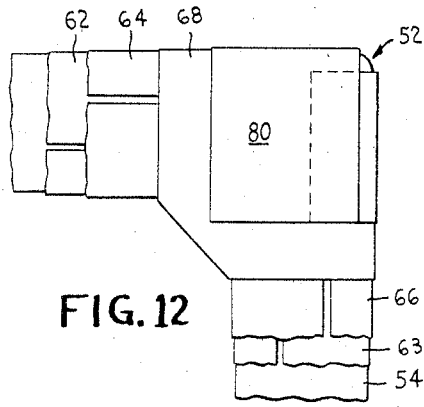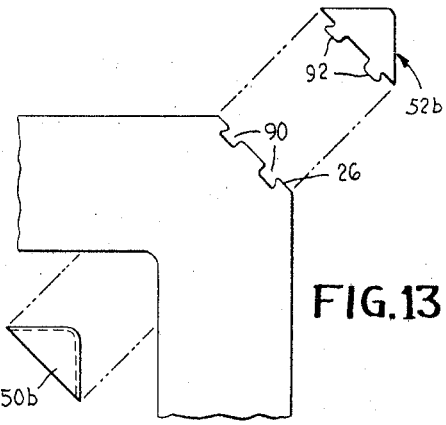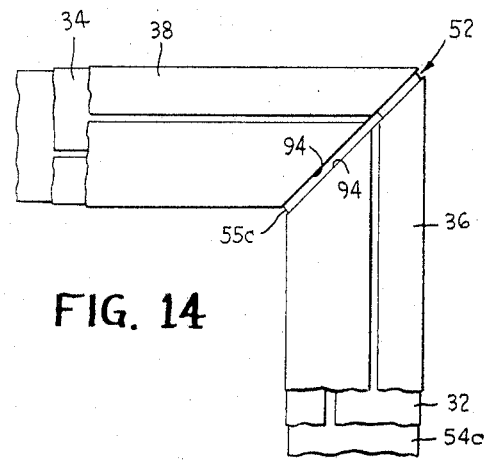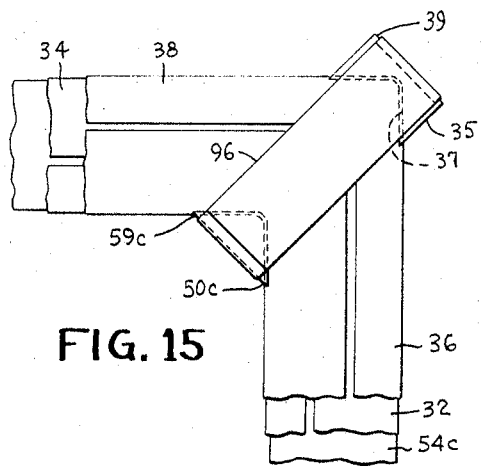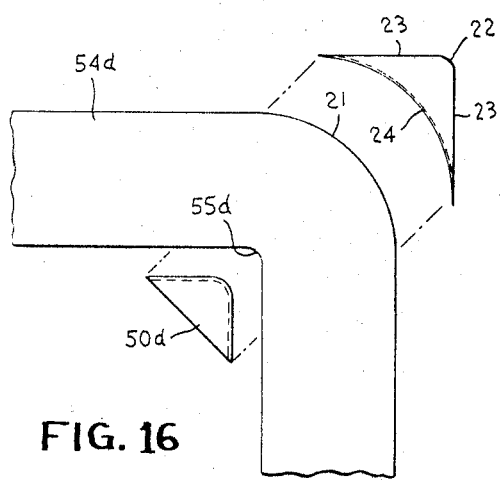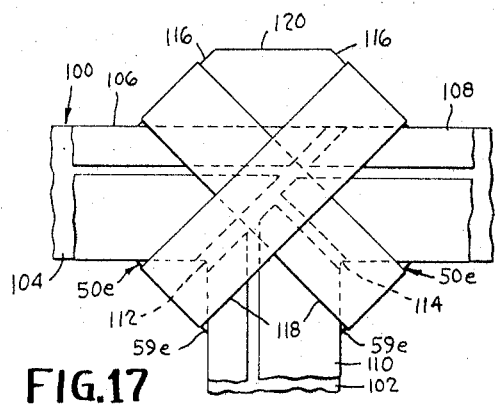

United States Patent Office 3,427,396
Patented Feb. 11, 1969

3,427,396
INSULATED BUSBAR ASSEMBLY AND METHOD
OF MAKING SAME
Lloyd S. Durward, Jr., Fairfield, Ohio, and Walter Giger, Jr., and Werner A. Krause, West Hartford, Conn., assignors to General Electric Company, a corporation of New York
Filed Aug. 5, 1966, Ser. No. 570,535
U.S. Cl. 174—68     13 Claims
Int. Cl. H02g 5/02; H01b 13/26, 7/34

ABSTRACT OF THE DISCLOSURE

An insulated angular busbar assembly including at least two straight busbar lengths coming together to form an angle such as a right angle, a T, or a "cross." Inside angle portions of the assembly are insulated by providing generally triangular insulating blocks or fillers which facilitate application of layers of insulating sheet material, tape or the like. Outside corners are insulated by removing a triangular portion of the busbar assembly at the corner and replacing it with a triangular insulating block, followed by application of sheet or tape insulating material.

BACKGROUND OF THE INVENTION

Field of the invention

The present invention relates to busbar assemblies and, more particularly, to improved busbar assemblies having novel and highly effective insulation at bends and junctures therein, and to methods of making same.

Busbars of relatively flat configuration are widely employed as a means of transmitting electrical power, and often a plurality of such busbars will be closely packed together within a housing so as to provide a high degree of efficiency in heat transfer from the busbars to the walls of the housing. Generally, means will be provided for pressing the adjacent busbars together and against the walls of the housing so as to achieve optimum transfer of heat to the walls and dissipation therefrom.

Description of the prior art

Since it is necessary that the busbars be insulated from each other, various types of insulation have been proposed and utilized including lacquers, extruded synthetic plastic coatings, and sheet material impregnated with various insulating resins. Because it is common to employ junctures and bends in such busbars, sheet material insulation has attained wide usage since it permits wrapping of the busbar after the desired configuration has been established. Both spirally wrapped tape and properly sized lengths of sheet material folded over the busbar in "cigarette wrap" fashion have enjoyed considerable acceptance as techniques for the application of such sheet material insulation.

Bends or joints in the busbars tend to present problems in the application of such sheet material insulation and will normally cause some bulging as a result of the fact that the outer surface of the busbar is of greater length than the inner surface. As a result, there will be a greater volume of sheet material at the inside of the bend or juncture than the outside and the overlapping of the sheet material will tend to produce a bulge, creating problems in maintaining the desired uniformly close spacing between adjacent busbars. The use of sheet material of varying dimensions in an effort to minimize this tendency for accumulation and bulging will often introduce problems in and of itself, particularly in requiring a high degree of accuracy in application, as well as increased cost. Since it is most desirable that the insulation be of uniform thickness throughout the busbar and that the spacing between busbars be maintained constant, efforts have been made to find a more satisfactory solution to the problem when using sheet material insulation in busbar assemblies having bends and junctures therein.

OBJECTS OF THE INVENTION

It is an object of the present invention to provide an insulated busbar assembly of the type having a busbar with bends or junctures therein which employs novel and highly effective insulation at the bends or junctures thereof.

It is also an object to provide such a busbar assembly wherein a plurality of busbars having bends or junctures therein are insulated in a novel manner at the bends and junctures therein so that the thickness of the insulation at the junctures and adjacent thereto is substantially uniform and the spacing between adjacent busbars is substantially uniform throughout.

Another object is to provide such a busbar assembly wherein a plurality of busbars having bends and junctures therein are effectively insulated throughout and disposed within a housing and held against each other and against the side walls of the housing to obtain effective heat dissipation through the walls of the housing.

A further object is to provide a novel method for applying sheet material insulation to busbars having bends or junctures therein so as to eliminate substantially any tendency for bulging of the sheet material insulation at the junctures or bends therein.

Other objects and advantages of the invention will be in part pointed out and in part become obvious from the following detailed description.

SUMMARY OF THE INVENTION

It has now been found that the foregoing objects and advantages can be readily attained in an insulated busbar assembly wherein a busbar having one substantially straight leg portion and a second substantially straight leg portion extending at an angle from the first leg portion to define an included angle at the juncture therebetween employs a novel insulating assembly at the juncture. In accordance with the broadest aspect of the invention, the insulating assembly includes an insulating member seated between the first and second leg portions at the juncture therebetween. The insulating member has a pair of edge surfaces adjacent the first and second leg portions which converge at the juncture and an outer edge surface extending between the pair of converging edge surfaces and leg portions to form a generally triangular shape. However, it will be appreciated that the inside of the juncture will oftentimes be arcuate or rounded so that the insulating member may employ a similarly arcuate or rounded configuration for its converging edge surfaces. Insulating sheet material is wrapped about the outer edge surface of the insulating member and the side surfaces thereof and about the juncture of the first and second leg portions to provide substantially parallel, planar surfaces along the sides thereof.

As used herein, the term "generally triangular" is intended to encompass truly triangular configurations as well as those wherein the converging edges have curvilinear portions, since in each instance the shape will include and be substantially defined by a triangle governed by the included angle at the juncture between the leg portions of the busbar.

In accordance with one preferred embodiment of the present invention, a second insulating member is provided at the outside edge of the juncture between the first and second leg portions. This second insulating member serves to minimize the problems of insulating at the outside of the juncture and may assume a variety of forms depending upon the nature of the juncture (i.e., whether formed by an elbow in the busbar or a T connection, etc.), and the particular wrapping technique employed, as will be described hereinafter.

In a T-type connection, a pair of generally triangular insulating members are provided at the insides of the two junctures formed between the base leg and two horizontal leg portions. When employing an elbow configuration with a substantially elongated curvilinear corner at the outside of the juncture, a second insulating member having a convexly curved configuration matching the curve of the corner is desirably provided and has generally straight side edge portions converging so as to form a substantially right angular corner for the busbar when assembled thereto.

In the preferred embodiment of the present invention employed at an elbow juncture, the busbar at the outside of the juncture which is formed with a diagonally extending surface substantially parallel to the outer edge surface of the inner insulating member. A second insulating member of generally triangular configuration is seated on the diagonal outer surface of the juncture so as to provide a substantially right angular corner for the busbar.

If so desired, the busbars and insulating members may be formed with interfitting projections and recesses such as a key and keyway to increase strength, facilitate alignment, and minimize the possibility of relative displacement. Since the insulating sheet material secures the insulating members in position, additional bonding or engagement therebetween is not essential. Temporary or relatively permanent affixation of the insulating members to the busbar, such as by adhesive, may be employed if so desired to facilitate positioning and wrapping of the insulating material thereabout.

Generally, two alternative techniques for applying the insulating sheet material to the insulating members and the busbar at the juncture may be employed. The first involves the insulating member at the inside of the juncture and a substantially right angled outside corner desirably provided by a second insulating member. Insulating sheet material is then wrapped about the edges of the busbar and insulating member(s) so as to overlie substantially all of the surfaces of the insulating member(s) and busbar at the juncture. Preferably, two pieces of sheet material are employed and overlapping of the ends thereof is avoided to minimize buildup in thickness with the two sheets having the location of their edges displaced relative to one another to ensure complete coverage.

In the second technique, the insulating members and busbar should provide parallel surfaces at the inside and outside of the juncture and a length of relatively narrow sheet material, or tape, is wrapped about the busbar at the juncture and the parallel surfaces thus provided.

In the several embodiments, the leg portions of the busbar have insulating material applied thereto which preferably terminates adjacent the juncture. The sheet material is applied over the insulating members and busbar juncture cooperates with the insulating members and the insulating material on the leg portions to insulate the conducting surface of the busbar. As can be seen, the insulating members themselves provide insulation for the busbar and so need not be completely overlapped by the insulating sheet material although this is generally desirable. Moreover, it is often desirable to apply a dielectric filter or caulking material between the insulating members and the insulation on the leg portions of the busbar to ensure total insulation. Materials such as polyester resin and silicone rubber pastes are satisfactory for this purpose.

Exemplary of insulating sheet material are synthetic plastic, laminates of synthetic plastic and glass fiber, glass fiber cloth impregnated with various resins such as polyesters, cloth woven of glass fiber and synthetic resin fibers impregnated with a resin, etc. To facilitate assembly and to maintain the insulating sheet material in position, preferably it is provided with a pressure-sensitive adhesive on the inside surface thereof so that it will bond to the underlying structure and to itself. A particularly advantageous material is a cloth woven from polyester and glass fibers and impregnated with a polyester resin and having on is inner surface a pressure-sensitive adhesive.

To provide a high degree of over surface travel between adjacent busbars, sheets of insulating material are placed between adjacent busbars and dimensioned to extend beyond the edges thereof. Exemplary of such sheet material is polyethylene terephthalate.

The invention will be more fully understood from the following detailed description and the scope will be pointed out in the appended claims.

BRIEF DESCRIPTION OF THE DRAWINGS

In the drawings:

FIGURE 1 is a side elevational view of a right angle bend, or elbow, busbar formed by welding two bars together and having insulating members fitted at the inside and outside of the juncture in accordance with the present invention;

FIGURE 2 is a perspective view of the insulation members illustrated in FIGURE 1;

FIGURE 3 is a side elevation of the busbar assembly illustrated in FIGURE 1, wrapped in insulating sheet material to provide an insulated juncture in accordance with the present invention;

FIGURE 4 is a cross-sectional view of a housing having a plurality of closely packed busbars therein;

FIGURE 5 is a side elevational view of an elbow busbar, wrapped with conventional insulating tape in accordance with a prior art practice;

FIGURES 6–12 are a series of side elevational views illustrating a sequence of steps in applying insulating sheet material to the assembly of insulating members and busbar of FIGURE 1 to form the insulated busbar of FIGURE 3;

FIGURE 13 is a side elevational view of an alternative construction for the insulating members and busbar to form an elbow bend;

FIGURE 14 is a side elevational view of an elbow busbar partially wrapped with insulation for an alternative construction embodying the present invention;

FIGURE 15 is a side elevational view of the elbow busbar of FIGURE 14 having insulating members fitted thereon and insulating tape wound thereover to provide an insulated juncture in accordance with the alternative embodiment of the present invention;

FIGURE 16 is a side elevational view of still another construction of busbar and insulating members for making an insulated juncture in accordance with the present invention; and FIGURE 17 is a side elevational view of an insulated T-busbar juncture embodying the present invention.

DESCRIPTION OF A PREFERRED EMBODIMENT

Figure 6:
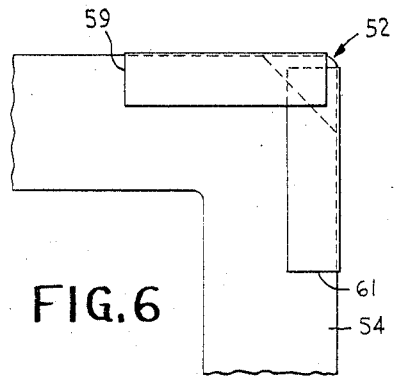

Referring now in detail to the attached drawings, FIGURE 4 generally illustrates a busbar assembly of the type in which the present invention is employed. More particularly, a series of busbars 20 which are of considerably greater width than thickness are wrapped with insulating material 10 and placed in closely packed relationship within a housing generally designated by the numeral 12 so that the side surfaces of the insulated busbars 20 are in contact with each other and with the side walls 14 of the housing. Top and bottom walls 16 are secured to the side walls 14 in the grooves provided by the ribs 17. Channel-shaped members 18 are engaged with the outwardly extending flanges 19 at the upper and lower ends of the side walls 14 to rigidify the housing and provide a suitable means for mounting the housing 12.

As will be appreciated, the close packing of the busbars 20 and their contact with the side walls 14 permits effective heat transfer and dissipation of the heat by the walls of the housing.

Referring to FIGURE 5, therein illustrated is a prior art type of elbow busbar 44 spirally wrapped with insulating tape 30 in accordance with conventional practice. Since it is imperative that the entire surface of the busbar be insulated by the tape, a problem is created at the bend formed by the juncture of the two leg portions of the elbow. Along the straight main parts of the leg portions, the tape may be spirally wound with a minor overlap as indicated by the numeral 42 thus providing a layer of insulating tape of relatively uniform thickness. However, at the juncture between the two leg portions, the tape 30 must travel over a relative large arc with the necessary overlapping as indicated by the numeral 46. Since the arc at the inside of the juncture is relatively short, many layers of the tape overlie each other to form a considerable thickness, as indicated at the numeral 40.

Since the spacing between adjacent busbars is determined by the maximum thickness of the insulation thereabout in order to maintain the desired parallel spaced relationship, this buildup thus creates hollow spaces between the bars and reduces heat transfer efficiency. In addition, this buildup will generally produce spacing between the outermost busbar and the adjacent wall of the housing so as to reduce still further the heat transfer efficiency of the assembly.

Turning now to FIGURES 1, 2, and 6–12, therein illustrated is one embodiment of the present invention. Although an elbow bend may be made by casting or forming a flat bar, a highly satisfactory technique often employed is that of welding together two flat busbar pieces 25, 27 to form a butt joint 29. The busbar piece 25 has a diagonal corner providing a surface substantially perpendicular to a line bisecting the included angle formed by the juncture of the pieces 25, 27. A first insulating member 50 is seated between the busbar pieces 25, 27 at the juncture therebetween and a second insulating member is seated at the diagonal corner 26 as most clearly seen in FIGURE 1.

As best seen in FIGURE 2, the insulating member 50 is of generally triangular configuration and has a pair of converging edge surfaces 54, 56 which are grooved to form a concavity 58 which cooperates with the rounded edge of the busbar pieces 25, 27 so as to fit snugly thereon. The insulating member 50 is dimensioned so that the outer edge surface 59 extends between the converging edge surfaces and the busbar portions 25, 27 at points spaced outwardly from the juncture therebetween sufficiently to permit facile wrapping with insulation in accordance with the present invention.

The insulating member 52 is of generally triangular configuration and has an inner edge surface 61 abutting against the corner 26 and outer edge surfaces 60 which converge outwardly therefrom. To cooperate with the rounded edge portions on the busbar pieces 25, 27 as customarily provided, the outer edge surfaces 60 are convex.

Turning now to the method of assembling the insulating members and insulating sheet material, the steps of a preferred technique are illustrated sequentially in FIGURES 6–12 wherein the busbar is designated by the numeral 54 and is preferably made in accordance with FIGURE 1. As seen in FIGURE 6, the corner insulating piece 52 is first placed in position on the corner 26 and two rectangular sheets of insulating material 59, 61 are wrapped around the outer edges of the busbar 54 and corner member 52 and adhere thereto by a pressure-sensitive adhesive on the inside surface thereof.

Figure 7:
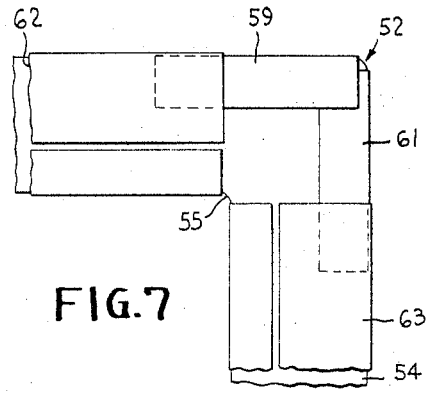
Figure 8:
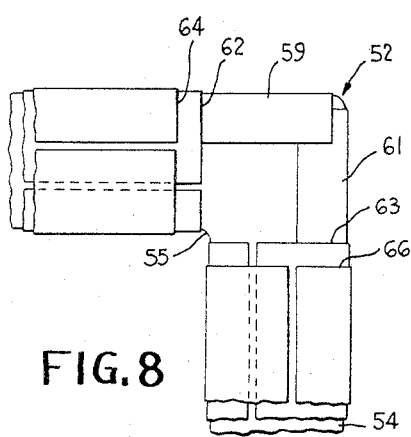

As seen in FIGURE 7, a pair of rectangular sheets 62, 63 of insulating material are wrapped about the leg portions of the busbar 54 and overlap the sheets 59, 61 but terminate outwardly from the inside corner 55 of the juncture between the leg portions of the busbar 54 so as to provide a spacing therebetween. As can be seen, the sheets 62, 63 are dimensioned so that they do not overlap and a slight spacing is provided between the adjacent edges thereof. In FIGURE 8 two additional sheets of insulating material 64, 66 are wrapped about the leg portions of the busbar 54 in a manner so that the spacing between their edges is displaced from the spacing between the edges of the sheets 62, 63. In addition, sheets 64, 66 are spaced so that they terminate further outwardly from the inside corner 55.

Figure 9:
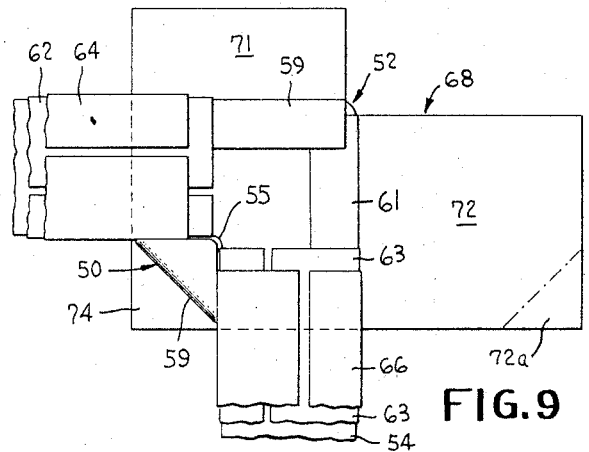
Figure 10:
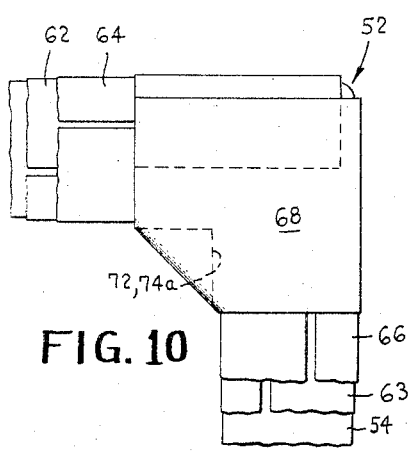

In FIGURE 9 the insulating member 50 is inserted between the leg portions of the busbar 54 at the inside corner 55. If so desired, a suitable dielectric material is desirably provided between the ends of the outer edge surface 59 of the insulating member 50 and the sheets of insulating material 64, 66. An L-shaped sheet of insulating material generally designated by the numeral 68 has a short leg 71 and a relatively long leg 72. The short leg 71 is folded over the adjacent edge of the busbar 54 and the insulating member 52 and the triangular portion 74 extending beyond the outer edge portion 59 of the insulating member 50 is folded thereabout. Thereafter the long leg portion 72 is folded on top of the short leg portion 71 and the triangular portion 72a on the long leg portion 72 extends beyond the outer edge portion 59 of the insulating member 50 and is folded thereabout. The resultant structure is shown in FIGURE 10 with the position of triangular portions 74 and 72a shown in dotted line.

Figure 11:
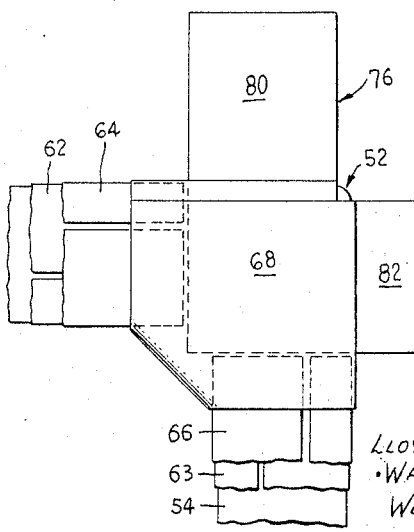

Turning now to FIGURE 11, a second L-shaped sheet of insulating material generally designated by the numeral 76 is now placed in position with its short leg portion 82 disposed over the long leg portion 72. The short leg portion 82 is first folded over the adjacent edge of the busbar 54 and then the leg portion 80 is folded over the adjacent edge of the busbar 54 so as to overlap the short leg portion 82 to provide the finished structure seen in FIGURE 12.

The several layers of insulating sheet material are bonded to the underlying structure by means of pressure-sensitive adhesive so as to provide a firm assembly. It can be seen that the sheet of insulating material 76 is dimensioned so as to terminate inwardly from the ends of the sheets of insulating material 64, 66. By staggering the points of termination of the several sheets of insulating material and the order of their placement, the desired amount of overlap at the juncture is obtained while at the same time the total thickness of the insulating material is minimized.

Thus, highly effective insulation is provided at the juncture of the two leg portions of the busbar using only several overlapping layers of insulating sheet material in combination with the insulating members at the inside and outside corners of the juncture.

Turning now to FIGURE 13, therein illustrated is an alternative embodiment of construction wherein the insulating member 50b is substantially the same as that heretofore described. In this embodiment, however, the insulating member 52b at the outside corner of the juncture is formed with a pair of dovetailed tongues or keys 92 which fit into grooves or keyways 90 at the corner 26. This dovetailing or keying of the insulating member 52b provides mechanical engagement and, accordingly, strength in the final assembly since the sheets of insulating material are not the sole support therefor.

Turning now to FIGURES 14 and 15, a still further embodiment of the present invention is therein illustrated. Here the busbar 54c has wrapped thereabout inner sheets of insulating material 32 and 34 and outer sheets of insulating material 36, 38 with the adjacent side edges thereof being cut on a diagonal at the juncture as illustrated by the numeral 94. The several sheets terminate outwardly from the inside corner 55c of the juncture between the leg portions of the busbar 54c to provide a slight spacing therebetween as illustrated. A generally V-shaped insulating member is inserted between the leg portions of the busbar 54c at the inside corner 55c, as in previous embodiments.

At the outside corner of the juncture, the busbar 54c retains a substantially right angle and an insulating member 35 having a generally V-shaped notch 37 is fitted thereonto. The V-shaped notch 37 is substantially right angular so that the provision thereof in a generally rectangular form for the insulating member 52c results in the outside edge surface 39 extending parallel to the outer edge surface 59c of the insulating member 50c. A relatively narrow sheet, or tape, of insulating material 96 may be wound about the insulating members 50c and 35 to cover the gap between the layers of insulating sheet material at the juncture and engage the insulating members in position. By this technique the sheet material on the leg portions of the busbar 54c continues into the juncture so as to leave only a minor diagonal gap and this gap is readily covered by the insulating members 35, 50c and the insulating tape 96. This technique can be used to minimize the time involved and the special sheet materials for wrapping in the technique illustrated in FIGURES 6–12, although it does increase the outside dimension of the busbar assembly.

Turning now to FIGURE 16, a variation of the present invention is illustrated as applied to an elbow busbar 54d having a rounded outside corner indicated by the numeral 21 rather than a diagonal corner or a right angle corner as illustrated in the previous embodiments. The insulating member in this construction, 50d, is again of generally triangular configuration and fits between the leg portions of the busbar 54d at the inside corner 55d. The outside insulating member 22 again has converging side edge surfaces 23 but its inside edge surface 24 is arcuate so as to conform closely to the arc of the outside corner 21 of the busbar 54d. In addition, the edge surface 24 is concave in cross section so as to fit snugly upon the rounded edge surface of the busbar 54d at the corner 21. A wrapping technique similar to that illustrated in FIGURES 6–12 may advantageously be employed with such a construction.

Turning now to FIGURE 17, therein illustrated is a variation of the technique employed in the embodiments of FIGURES 14 and 15 so as to permit use of the tape wrapping technique to a T-type busbar generally designated by the numeral 100 and having a base leg portion 102 and horizontal leg portions 104. The sheets of insulating material 106, 108 and 110 are wrapped about the leg portions 102, 104 so that their inside edge portions terminate outwardly from the inside corners 112, 114 of the junctures between the leg portions 102 and the horizontal leg portions 104. As illustrated in dotted line, the ends of the sheet material 108, 110 are cut in substantially V-shaped configuration and the end of the sheet material 106 is cut on a diagonal so as to avoid overlapping thereof and to result in minor spacing therebetween. A pair of insulating members 50e of generally V-shaped configuration are inserted between the base leg portion 102 and the horizontal leg portions 104 as in previous embodiments. An outer insulating member 114 of generally V shaped configuration is located at the outside of the juncture and is dimensioned considerably larger than the insulating members 50e so as to bridge and extend somewhat beyond the area intersected by the base leg portion 102.

As can be seen, the converging sides 116 of the insulating member 114 are substantially parallel to the outer edge surfaces 59e of the insulating members 50e so that relatively narrow strips of insulating sheet material 118 may be wrapped thereabout readily to hold the insulating members in firm assembly against the busbar 100 and cover the spacing between the sheets of insulation 106, 108 and 110 on the leg portions 102, 104 and thus provide a fully insulated juncture.

Various modifications of the constructions and techniques may be employed as will become apparent to those skilled in the art. For example, the technique and construction shown in FIGURES 6–12 may be applied to a T busbar by placement of two insulating members at the junctures between the base leg portion and the horizontal leg portions and without the need for employing an insulating member at the outside of the juncture. In such a technique the sheets of insulating material are again dimensioned to bridge the gap between the sheets of insulating material on the several leg portions which terminate outwardly from the junctures. These sheets of insulating material at the junctures thus overlap the ends of the insulating sheet material on the leg portions and are folded about the insulating members so as to provide a firm, effective insulating assembly.

The concepts of the present invention are equally applicable to cross-shaped busbars by the provision of four insulating members at the inside corners of the junctures and the wrapping technique of FIGURES 6–12 or FIGURES 14 and 15 may be applied equally thereto. Moreover, the bends in the busbars need not be right angular and the configuration of the insulating members may be varied to accommodate the included angle at the junctures.

The insulating members may be constructed of various materials having the necessary insulating properties. Although glass and ceramics may be employed, synthetic plastics are highly satisfactory and readily molded or formed into the desired configuration. Exemplary of the synthetic plastics which may be employed are phenolics, polyesters and alkyds and such resins are preferably filled with material such as asbestos or glass fibers. The configuration of these members should conform closely to the busbar to minimize air gaps therebetween and they should be substantially equal in thickness to the busbar to provide a uniform planar surface in combination therewith.

As can be seen, in each of the several embodiments the overlapping of the insulating material at the junctures between the leg portions of the busbars is substantially minimized so that the thickness of the insulating material at the junctures and along the main portions of the leg portions is relatively uniform. In this fashion, the busbars may be closely packed together as indicated in FIGURE 4 of the drawings to effect optimum heat transfer efficiency both between the busbars themselves and between the busbars and the walls of the housing in which they are disposed.

Thus, it can be seen that the present invention provides an insulated busbar assembly having novel and highly effective insulation at the bends or junctures thereof so that the thickness of the insulation upon the busbars is substantially uniform. In this manner, the spacing between adjacent busbars may be maintained substantially uniform and the busbars closely packed together in fully insulated relationship to obtain effective heat dissipation through the walls of the housing in which they are disposed.

It is well understood that various changes in the details, materials, and arrangement of parts, which have been herein described and illustrated in order to explain the nature of the invention, may be made by those skilled in the art within the principle and scope of the invention as expressed in the claims.

Having thus described the invention, we claim:

1. In an insulated busbar assembly, the combination comprising:
   (a) a busbar having a first substantially straight leg portion and a second substantially straight leg portion extending at an angle from said first leg portion and defining an included angle at the juncture therebetween; and
   (b) an insulating assembly at said juncture including:
      (1) an insulating member seated between said first and second leg portions in said juncture and having a pair of edge surfaces adjacent said first and second leg portions converging at said juncture and an outer edge surface extending between said pair of converging edge surfaces and said leg portions; and
  (2) insulating sheet material wrapped about said outer edge surface of said insulating member and said first and second leg portions of said busbar at said juncture.

2. The busbar assembly of claim 1 wherein said insulating assembly includes a second insulating member on said busbar at the end of said juncture opposite from said first mentioned insulating member, and wherein said insulating sheet material also wraps said second insulating member.

3. The busbar assembly of claim 2 wherein said busbar is of elbow-like configuration with a diagonally extending corner at the outside of said juncture opposite from said first mentioned insulating member, and wherein said second insulating member seats on said diagonal corner of said busbar.

4. The busbar assembly of claim 3 wherein said busbar diagonal corner and said second insulating member have cooperating projections and recesses interfitting to provide mechanical engagement therebetween.

5. The insulated busbar assembly of claim 2 wherein said second insulating member provides an outer edge surface parallel to said outer edge surface of said first mentioned insulating member, and wherein said insulating sheet material is of relatively narrow width and is wound about said insulating members and said busbar in tape-like fashion.

6. The insulated busbar assembly of claim 1 wherein said insulating sheet material is folded about said outer edge surfaces of said insulating member and about the exposed surfaces of said busbar so as to encase said juncture.

7. The insulated busbar assembly of claim 1 wherein said busbar has a third substantially straight leg portion so as to define a substantially T configuration, and wherein said insulating assembly includes a second insulating member of similar configuration seated at the juncture between said second and third leg portions and wherein said insulating sheet material is wrapped about said second insulating member and the juncture between said second and third leg portions.

8. The insulated busbar assembly of claim 1 wherein said busbar of generally elbow configuration with a substantially right angled corner at the outside of said juncture, and wherein said insulating assembly includes a second insulating member having a recess in the inside edge surface thereof fitting about said corner and an outer edge surface extending substantially parallel to the outer edge surface of said first mentioned insulating member, and wherein said insulating sheet material extends about said first mentioned and second insulating members and the juncture between said leg portions in tape like fashion.

9. The insulated busbar assembly of claim 1 wherein said busbar is of substantially T configuration and has a diagonal corner at the outside of said juncture, said busbar leg portions having sheet material insulation wrapped thereabout terminating outwardly from said juncture wherein said insulating assembly includes a second insulating member of generally similar configuration seated at said diagonal corner, said insulating sheet material of said insulating assembly being wrapped about both of said insulating members and overlapping said sheet material insulation on said busbar leg portions.

10. In an insulated busbar assembly, the combination comprising:
  (a) a housing having side walls of heat conducting material;
  (b) a plurality of busbars each having relatively flat side surfaces and a first substantially straight leg portion and a second substantially straight leg portion extending at an angle from said first leg portion, said first and second leg portions defining an included angle at the juncture therebetween;
  (c) an insulating assembly at said juncture of each of said plurality of busbars including:
    (1) an insulating member seated between said first and second leg portions in said juncture and having a pair of edge surfaces adjacent said first and second leg portions converging at said juncture and an outer edge surface extending between said pair of converging edge surfaces and said leg portions; and
    (2) insulating sheet material wrapped about said outer edge surface of said insulating member and said first and second leg portions of said busbar at said juncture; and
  (d) insulation on said leg portions of said plurality of busbars extending to adjacent said juncture, said insulating assembly at said juncture and said insulation being relatively equal in thickness, said plurality of busbars having their side surfaces closely placed together and having the outermost of said plurality of busbars having their side surfaces pressed against said side walls of said housing to provide heat transfer efficiency between said busbars and said side walls of said housing.

11. The busbar assembly of claim 10 wherein said insulating assembly includes a second insulating member on said busbar at the end of said juncture opposite from said first mentioned insulating member, and wherein said insulating sheet material also wraps said second insulating member.

12. The busbar assembly of claim 11 wherein said busbar is of elbow-like configuration with a diagonally extending corner at the outside of said juncture opposite from said first-mentioned insulating member, and wherein said second insulating member seats on said diagonal corner of said busbar.

13. The insulated busbar assembly of claim 10 wherein each of said busbars has a third substantially straight leg portion so as to define a substantially T configuration and wherein each of said insulating assemblies includes a second insulating member of similar configuration seated at the juncture between said second and third leg portions and wherein said insulating sheet material is wrapped about said second insulating member and the juncture between said second and third leg portions.

References Cited
UNITED STATES PATENTS

| | | | |
|---|---|---|---|
| 3,013,106 | 12/1961 | Cornell | 174—71 |
| 3,178,326 | 4/1965 | Musgrave | 174—72 |

DARRELL L. CLAY, *Primary Examiner.*

U.S. Cl. X.R.

156—53; 174—72